Figure 1:
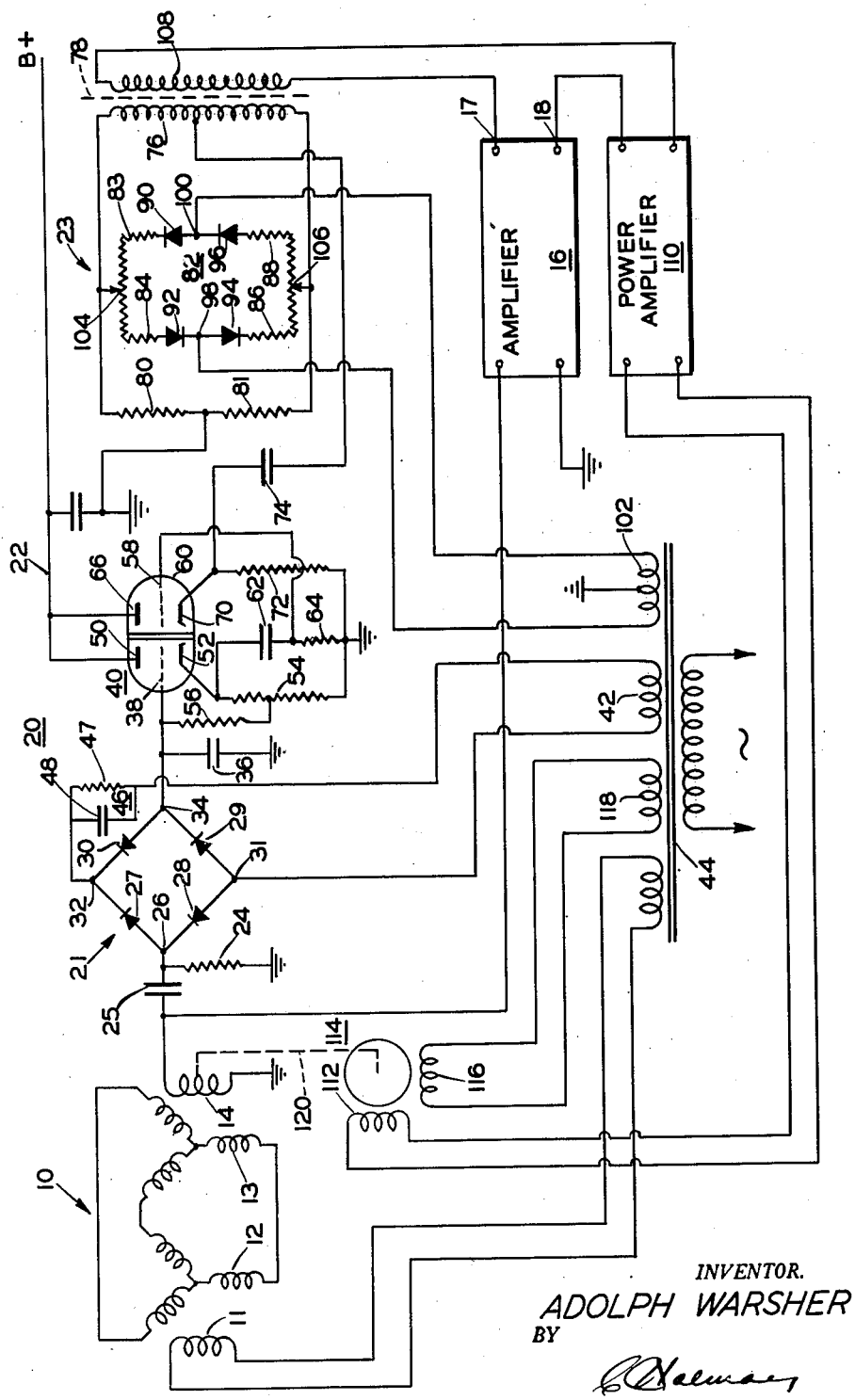

March 24, 1953 — A. WARSHER — 2,632,872
CONTROL CIRCUIT
Filed April 25, 1949 — 2 SHEETS—SHEET 1

INVENTOR.
ADOLPH WARSHER
BY
-ATTORNEY-

March 24, 1953 A. WARSHER 2,632,872
CONTROL CIRCUIT
Filed April 25, 1949 2 SHEETS—SHEET 2

A

B

C

D

E

A

B

C

D

*INVENTOR.*
*ADOLPH WARSHER*
BY
*ATTORNEY*

Patented Mar. 24, 1953

2,632,872

UNITED STATES PATENT OFFICE 2,632,872
CONTROL CIRCUIT

Adolph Warsher, Maywood, N. J., assignor to Bendix Aviation Corporation, Teterboro, N. J., a corporation of Delaware Application April 25, 1949, Serial No. 89,415

13 Claims. (Cl. 318—30)

The present invention relates generally to control systems and more particularly to systems for operating a phase sensitive operating device such as a servomotor in response to displacement or error signal voltages.

In order to properly operate a phase sensitive operating device such as a servomotor in response to a displacement or error signal produced for instance by the transmitter of a remote indicating and/or control system, it has been standard practice to produce a rate lead voltage, which is the first time derivative of the error signal, and mix it with the error signal before it is applied to the control phase of the motor in order to bring the motor to a complete stop at the time when the member operated upon has reached its desired position. In these known systems, the desired rate lead voltage was obtained by utilizing complicated and unstable control circuits such as peak detectors and phase shifting circuits, including filters and other phase lag circuits.

As will be apparent to those skilled in the art, use of such control circuits injects various disadvantages which are overcome by the present invention.

An object of the present invention, therefore, is to provide novel and simple means for obtaining rate lead voltages without the use of the complicated control circuits heretofore required.

Another object of the invention is to provide a novel, simple and stable means for obtaining a rate lead voltage by demodulating a varying suppressed carrier signal and without utilizing filter or lag networks, advancing the demodulated signal in phase and then remodulating it upon another carrier.

These and other objects and advantages of the invention will appear more fully hereinafter from a consideration of the detailed description which follows, taken together with the accompanying drawings wherein one embodiment of the invention is illustrated. It is to be expressly understood, however, that the drawings are for the purpose of illustration and description only, and are not intended as a definition of the limits of the invention.

In the drawings,

Figure 1 is a schematic circuit diagram illustrating the novel circuit of the present invention;

Figures 2A to 2E, inclusive, constitute graphic illustrations of the relationship between the incoming error signal and the demodulated wave; and Figures 3A to 3D, inclusive, constitute graphic illustrations of the relationship between the phase shifted demodulated error signal and the modulated carrier signal derived therefrom.

For a better understanding of the operation of the novel circuit of the present invention, the latter is shown in Figure 1 of the drawings as applied to a well known remote indicating and/or controlling system, generally designated with the reference character 10, in which an error or displacement signal voltage is developed upon movement of a transmitter rotor winding 11 relative to stator windings 12, such error signal being impressed across receiver stator windings 13 and induced in a movable rotor winding 14 in a manner well known in the art. The error signal is communicated to the input of a conventional amplifier and discriminator unit generally indicated by a box 16. The output voltage of the amplifier unit 16 appears across terminals 17 and 18 as an A. C. signal of a phase depending on the phase of the incoming error signal and of an amplitude proportional to the amplitude of the signal voltage. In conventional systems this output voltage is amplified by a power amplifier which includes the conventional discriminator and phase shifter, generally designated with the reference character 110, and applied to the variable phase 112 of a servomotor 114 which then operates on a member to be controlled to displace it in a direction corresponding with the phase of the incoming signal, the motor also being connected to displace the rotor of the receiver until the signal induced therein is reduced to null value. Due to inertia of the moving parts of the motor and associated gearing, the motor will continue to rotate for a short while after the error voltage has reached null with the consequence that a signal of the opposite polarity will be induced in the rotor of the receiver and the motor will be excited to rotate in the opposite direction, such operation continuing until the system finally comes to rest. This phenomenon, usually termed hunting, is highly undesirable and various means and methods have been proposed heretofore to induce a signal to oppose the excitation voltage so as to prevent overtravel by the motor.

According to the present invention a signal proportional to the rate of change of the signal voltage, or a rate lead voltage, leading the motor displacement signal by 90 degrees is superimposed on the excitation voltage in opposition thereto so as to brake the motor to a complete stop by the time the signal voltage has reached null. In other words, as long as the signal voltage is of constant value no rate lead voltage will be developed, but as soon as the signal voltage changes, a voltage corresponding to the rate of change of the signal voltage will be developed and induced into the motor excitation circuit in a manner which will hereinafter be apparent.

The novel means for obtaining the rate lead voltage, which may be termed a synchronous lead stabilizer, is generally indicated at 20 and comprises a synchronous switch or demodulator bridge circuit 21, cathode follower phase shift network 22 and a synchronous switch modulator 23. The signal induced in receiver rotor winding 14 is impressed across a load resistor 24 through a coupling capacitor 25 and connected to a point 26 on bridge 21.

The bridge comprises four crystal rectifiers 27, 28, 29 and 30 arranged so as to present a very low impedance to current flow through the bridge from point 31 to point 32 thereof but to offer extremely high impedance to current flow in the opposite direction. The other end 34 of the bridge, opposite to point 26, is coupled to ground through a capacitor 36 and to the control grid 38 of a triode tube 40 operating as a cathode follower. Disregarding for the moment the circuit connected to points 31 and 32 of the bridge, rectifiers 28 and 30 will normally oppose current flow from point 26 to point 34. An A. C. voltage, which may be termed a trigger voltage, is applied across points 31 and 32 of the bridge from a secondary winding 42 of a transformer 44 which may be excited from a source of A. C. power having the same frequency, and being synchronized with the carrier of the received error signal. The trigger voltage applied to bridge points 31 and 32 is shifted in phase by a lag network 46 consisting of parallel connected resistor 47 and capacitor 48 in circuit with the secondary 42 of the transformer for a purpose which will presently appear.

Tube 40 has a plate 50 connected to a source of D. C. potential and a cathode 52 connected to ground through a load resistor 54. The tube is self-biased by connecting grid leak resistor 56 to a suitable tap on the load resistor as shown. The signal appearing across cathode load resistor 54 is applied to a phase shifting network comprising coupling capacitor 62 and grid resistor 64 and the signal from the phase shifting network is applied to a grid 58 of a second triode 60 also operating as a cathode follower. Plate 66 of tube 60 is connected to a source of D. C. power and cathode 70 is connected to ground through a load resistor 72. The output signal of tube 60 appearing across resistor 72 is then advanced in phase by another phase shift network comprising a coupling capacitor 74, and one or the other of a pair of resistors 80, 81.

A synchronous switch 82 is connected across the primary winding 76 of a transformer 78 and comprises one resistor 83, 84, 86 and 88 and one crystal rectifier 90, 92, 94 and 96 in each arm thereof, respectively. An A. C. potential is applied across points 98 and 100 of the synchronous switch from a grounded center-tapped secondary 102 of transformer 44. The synchronous switch 82 is balanced by a pair of adjustable taps or points 104 and 106 so that with an alternating voltage applied across points 98 and 100 and no signal across load resistor 72 no signal will appear across transformer winding 76 in which case the latter points will effectively be at ground potential.

Figure 2:
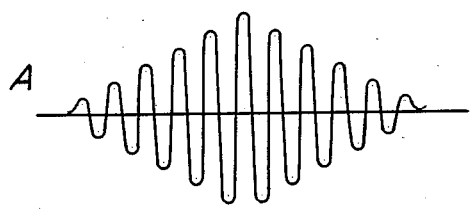
Figure 2:
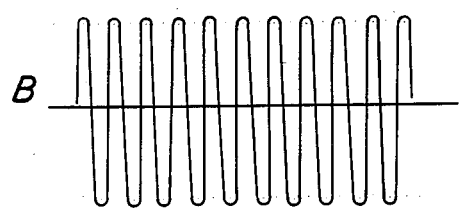
Figure 2:
Figure 2:
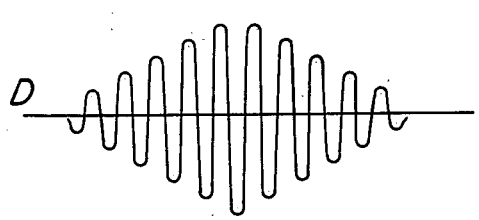
Figure 2:

For a better understanding of the operation of the novel system hereof, it will first be assumed that a suppressed carrier modulated signal such as indicated in Figure 2A is received in receiver rotor winding 14 and applied to point 26 of bridge 21 and that a constant amplitude A. C. trigger voltage, such as shown in Figure 2B, of identical frequency and synchronized with the carrier frequency of the signal, is impressed across bridge points 31 and 32 from secondary 42 of transformer 44 through the lag network 46. With the phase of incoming signal such as shown in Figure 2A the trigger voltage will cause current to flow from point 31 to point 32 just as the signal voltage starts to go positive. Thus crystal rectifiers 28 and 30, which when non-conductive prevent current flow from point 26 of the bridge to point 34, and rectifiers 27 and 29, which when non-conductive prevent current flow in the reverse direction, become conductive to offer only a negligible impedance to flow of current between points 26 and 34, thereby permitting capacitor 36 to be charged to the maximum value of the signal voltage pulse as indicated in Figure 2C. As soon as the peak of the signal voltage pulse has been attained, the trigger voltage will have fallen to zero and the current through the rectifiers will have ceased whereby point 26 again becomes effectively isolated from point 34 by the high impedance offered by the rectifiers in their non-conducting state. As the next signal voltage pulse becomes positive, the trigger voltage again causes the rectifiers to conduct thereby permitting condenser 36 to be charged to the new signal voltage pulse peak value at which time the bridge is again made non-conducting. It is thus seen that the bridge acts as a switch permitting current flow between points 26 and 34 only during the positive rise of the signal voltage. Condenser 36 retains the previous charge until current again starts flowing into it because the current leaking to ground through grid leak resistor 56 is negligible. Thus the voltage appearing across capacitor 36 and consequently on grid 38 varies substantially with the modulation envelope of the incoming error signal in a positive direction as indicated in Figure 2C.

If, on the other hand, the phase of the error signal is reversed, such as indicated in Figure 2D, the trigger voltage will cause conduction of the bridge during the negative halves of the incoming signal pulses and consequently the demodulated signal appearing across capacitor 36 and on grid 38 will be as indicated in Figure 2E.

Figure 3:
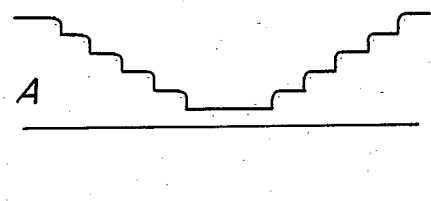
Figure 3:
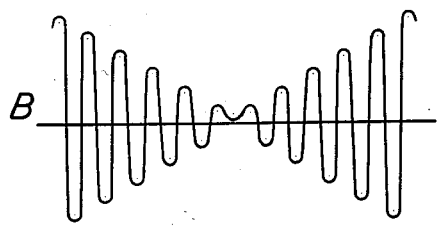
Figure 3:
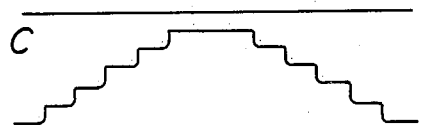
Figure 3:
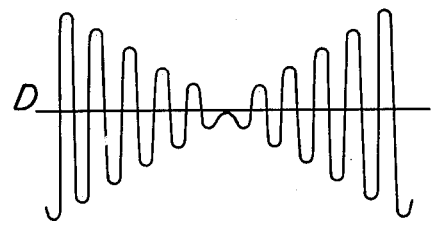

This demodulated signal must now be shifted in phase approximately 90 degrees in order to produce a rate lead voltage to oppose the excitation voltage operating the output motor to anticipate the error signal so as to prevent overtravel of the motor. This phase shifting is accomplished through the use of a pair of simple R-C lead networks separated by cathode follower 60. The signal impressed on grid 38 will appear across the load resistor 54 at a low impedance level and then will be shifted in phase approximately 45 degrees by coupling capacitor 62 and grid leak resistor 64. The phase shifted signal is applied to grid 58 of the second cathode follower and the signal appearing across its load resistor 72 is then shifted through another 45 degrees by coupling capacitor 74, and one or the other of resistors 80, 81. Thus the signal appearing across primary 76 and across points 104 and 106 of synchronous switch 82 will be identical in form to that shown in Figure 2C but advanced in phase 90 degrees as indicated in Figure 3A. This signal will now be impressed on a carrier by synchronous switch 82 which has a balanced carrier voltage impressed across points 98 and 100 thereof. The synchronous switch 82 is of a type well known in the art and when the carrier causes current to flow from point 100 to point 98 through rectifiers 90 and 92, point 104 is at ground potential and the voltage across resistor 72 is advanced in phase approximately 45 degrees by coupling condenser 74 and resistor 81 and appears across the upper half of primary 76 of transformer 78. When the carrier voltage reverses, thus causing current flow from point 98 to point 100 through rectifiers 94 and 96, point 106 is at ground potential and the voltage across resistor 72 is advanced in phase approximately 45 degrees by coupling condenser 74 and resistor 80 and appears across the lower half of primary 76 of transformer 78. In this manner the voltage appearing across primary 76 will be of a wave form such as illustrated in Figure 3B when the voltage across resistor 72 is as shown in Figure 3A.

If the phase shifted signal is of a negative potential such as indicated in Figure 3C derived from a signal having a phase as indicated in Figure 2D the modulated carrier voltage appearing across primary 76 will be similar in form to the wave indicated in Figure 3B but of opposite phase such as indicated in Figure 3D.

Thus it is seen that the output signal at the secondary 108 of transformer 78 will be a voltage of the same carrier frequency as the incoming error signal and in phase therewith and modulated with the same signal as the error signal but advanced approximately 90 degrees from the phase thereof.

The secondary 108 of transformer 78 is connected in series with output terminals 17 and 18 of amplifier 16 so that the rate lead voltage will be superimposed on the amplified error signal. The composite signal is amplified by power amplifier 110 and applied to the variable phase 112 of motor 114. The constant phase 116 of the motor is shown as being excited from secondary winding 118 of transformer 44. The motor may be adapted to move a member such as a rudder or elevator of an aircraft and also to drive the receiver rotor winding 14 through a suitable linkage or reduction gear generally indicated at 120 into positional agreement with the transmitter rotor winding 11.

The rate lead circuit 20 has, of course, many applications other than that here described but in order to illustrate one application thereof it has been shown in combination with a self-synchronous control circuit utilizing a servomotor for which it is particularly suitable because of its simplicity and dependable operation.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

I claim:

1. A system for obtaining a carrier modulated rate lead voltage from a suppressed carrier modulated signal voltage comprising a synchronous switch demodulator for deriving a demodulated signal from said signal voltage, impedance converting means for providing a high impedance output for said demodulated signal, means connected to said impedance converting means for advancing said signal in phase approximately 90 degrees, and means for modulating a carrier by said phase shifted signal.

2. A system for obtaining a carrier modulated rate lead voltage from a suppressed carrier modulated signal voltage comprising synchronous switching means for deriving from said signal voltage a demodulated signal, means for providing a high impedance output for said demodulated signal, means connected to said last-named means for advancing said signal approximately 90 degrees in phase, and means for modulating a carrier voltage with said phase advanced signal to provide a second suppressed carrier modulated signal voltage.

3. In a system for obtaining a carrier modulated rate lead voltage from a carrier modulated signal, a phase-sensitive demodulator bridge for deriving a signal of a polarity depending on the phase of the carrier, an impedance transforming device connected with said bridge for providing a high impedance output for said derived signal, means connected to said device for advancing said signal in phase by substantially 90 degrees, and means for modulating a carrier with said phase advanced signal.

4. In a synchronous lead stabilizer for obtaining a carrier modulated rate lead voltage from a modulated carrier signal, the combination of a demodulator comprising a synchronous switch, means for operating said switch in synchronism with the carrier of said signal, a condenser connected to said switch and adapted to be charged substantially to the peak voltage of successive carrier waves whereby an undulating voltage proportional to the envelope of said modulated carrier is impressed thereacross, means associated with said condenser for advancing the phase of said demodulated signals and means for impressing said phase advanced signal on a further carrier wave bearing a predetermined relation to the modulated signal carrier.

5. In a motor control system the combination with means for developing A. C. signal voltages, means for amplifying said signals, and a motor adapted to be operated in response to the signal voltages, of means for obtaining a rate lead voltage from modulations of said A. C. signal voltages and mixing said rate lead voltage with the output of said amplifier, said last mentioned means comprising a phase sensitive synchronous switch, a phase shift network, said switch being connected between said means for developing A. C. signal voltages and said phase shift network and triggered by an A. C. voltage synchronized with and of the same frequency as the error signal causing said switch to conduct during a predetermined portion of successive unidirectional waves of said error signal so as to impress on said phase shift network a unidirectional demodulated signal of a polarity depending on the phase relationship between said displacement signal and said trigger voltages, said phase shift network being adapted to advance said demodulated signal in phase substantially 90 degrees, and a modulator connected to said phase shift network for modulating a carrier having identical frequency as said A. C. signal voltages and in phase therewith with said demodulated phase shifted signal to produce a rate lead voltage, said rate lead voltage being superimposed on the output signal from said amplifier and the composite signal applied to said motor.

6. Rate lead stabilizer for obtaining a rate lead voltage from modulations on an A. C. displacement signal comprising a rectifier bridge having four points interconnected by rectifiers, a phase shift circuit and a modulator; two diametrically opposite points on said bridge being connected to said displacement signal and said phase shift circuit, respectively, and the remaining two diametrically opposite points being connected across a source of A. C. potential of identical frequency with said displacement signal and synchronized therewith, the rectifiers being so arranged that when they conduct current from one of the two remaining points to the other they will permit current flow between the first two mentioned points but when they are not conducting current between the said receiving points they will oppose current flow between the two first mentioned points, said A. C. potential being arranged to cause said rectifiers to conduct during the rise of successive displacement signal waves thereby applying to the phase shift network a demodulated signal proportional to one side of the envelope of the displacement signal and of a polarity depending on the phase relationship between said signal and said A. C. potential, said phase shift circuit being adapted to advance said demodulated signal in phase substantially 90 degrees and said modulator being adapted to modulate a carrier, having the identical frequency and phase of said displacement signal, by said phase shifted demodulated signal thereby providing a rate lead voltage of said displacement signal.

7. A control system comprising a displacement signal transmitter, a signal receiver adapted to develop a carrier modulated error signal upon positional disagreement of said receiver with said transmitter, a motor adapted to drive said receiver into positional agreement with said transmitter, an amplifier connected to said receiver and adapted to provide an amplified signal, a rate lead stabilizer connected to said signal receiver and comprising a phase sensitive demodulator adapted to produce a signal proportional to modulations of said error signal and of a polarity depending on the phase of said error signal, a phase shift circuit associated with said demodulator and adapted to advance said demodulated signal in phase substantially 90 degrees, and a modulator connected to said phase shift circuit and adapted to impress said phase shifted demodulated signal on a carrier having the same frequency and being in phase with the error signal carrier, said phase shifted modulated signal being combined with said amplified signal to produce a composite signal, said composite signal being applied to the motor to operate the motor in response thereto.

8. A synchronous lead stabilizer for obtaining a rate lead voltage from a suppressed carrier modulated displacement signal comprising a synchronous switch demodulator controlled by a reference voltage of the same frequency as said carrier to produce a demodulated signal of a polarity depending on the phase relationship between said reference voltage and said carrier, a phase shift circuit associated with said demodulator for advancing said demodulated signal in phase by substantially 90 degrees, and a modulator connected to said phase shift circuit controlled by said reference voltage for impressing on a carrier having the same frequency as said displacement signal carrier and synchronized therewith suppressed carrier modulations corresponding to said phase shifted demodulated displacement signal.

9. In combination, a demodulator comprising a synchronous switch having an input and an output and adapted to receive at its input a modulated carrier signal and develop a demodulated signal at its output, phase advancing means connected with said switch output for advancing the phase of said demodulated signal, and a synchronous switch modulator associated with said phase advancing means for receiving and remodulating said demodulated signal.

10. In a system for obtaining a first time derivative voltage from a modulated suppressed carrier signal voltage, a synchronous switch for deriving a demodulated signal from said signal voltage, means for advancing the phase of the signal, impedance converting means connecting said switch and said phase advancing means and providing a high impedance output for said switch and a low impedance input for said phase advancing means, and means for modulating a carrier by the phase advanced signal.

11. In a system for obtaining a modulated carrier rate lead voltage from a modulated carrier signal voltage, a demodulator for providing a demodulated signal from the signal voltage, first means for advancing the phase of the demodulated signal, a cathode follower connecting said modulator and said phase advancing means, second means for advancing the phase of the demodulated signal, a second cathode follower connecting said first phase advancing means and said second phase advancing means, and means for modulating a carrier by said phase advanced signal.

12. In a system for obtaining a phase advanced voltage from an undulating signal voltage, first means for advancing the phase of the signal, second means for advancing the phase of the signal, and a cathode follower connecting said first and second means.

13. A rate lead stabilizer for obtaining a rate lead voltage from modulations on an A. C. displacement signal comprising a rectifier bridge having four points interconnected by rectifiers, a phase shift circuit and a modulator; two diametrically opposite points on said bridge being connected to said displacement signal and said phase shift circuit, respectively, and the remaining two diametrically opposite points being connected across a source of A. C. potential of identical frequency with said displacement signal and synchronized therewith, the rectifiers being so arranged that when they conduct current from one of the two remaining points to the other they will permit current flow between the first two mentioned points, but when they are not conducting current between the said receiving points, they will oppose current flow between the two first mentioned points, said A. C. potential being arranged to cause said rectifiers to conduct during the rise of successive displacement signal waves thereby applying to the phase shift network a demodulated signal proportional to one side of the envelope of the displacement signal and of a polarity depending on the phase relationship between said signal and said A. C. potential, said phase shift circuit being adapted to advance said demodulated signal in phase substantially 90 degrees and said modulator being adapted to modulate a carrier, having the identical frequency and phase of said displacement signal, by said phase shifted demodulated signal thereby providing a rate lead voltage of said displacement signal, and means for combining the displacement signal and rate lead voltage.

ADOLPH WARSHER.

REFERENCES CITED

The following references are of record in the file of this patent:

UNITED STATES PATENTS

| Number | Name | Date |
|---|---|---|
| 2,068,490 | Hull | Jan. 19, 1937 |
| 2,088,654 | Hull | Aug. 3, 1937 |
| 2,250,284 | Wendt | July 22, 1941 |
| 2,409,970 | Agins | Oct. 22, 1946 |